(12) United States Patent
Wetzel et al.

(10) Patent No.: US 7,296,270 B2
(45) Date of Patent: Nov. 13, 2007

(54) METHOD AND CONTROL UNIT FOR CONTROLLING TECHNICAL PROCEDURES IN A MOTOR VEHICLE

(75) Inventors: Gabriel Wetzel, Stuttgart (DE); Jens Fiedler, Thalmassing (DE)

(73) Assignee: Robert Bosch GmbH, Stuttgart (DE)

( * ) Notice: Subject to any disclaimer, the term of this patent is extended or adjusted under 35 U.S.C. 154(b) by 898 days.

(21) Appl. No.: 10/013,167

(22) Filed: Dec. 10, 2001

(65) Prior Publication Data

US 2002/0099757 A1    Jul. 25, 2002

(30) Foreign Application Priority Data

Dec. 8, 2000    (DE)    ................................ 100 61 001

(51) Int. Cl.
- G06F 9/46    (2006.01)
- G06F 7/38    (2006.01)
- G06F 12/00   (2006.01)
- G05B 11/01   (2006.01)
- G05B 15/00   (2006.01)
- G05D 1/00    (2006.01)

(52) U.S. Cl. ...................... 718/106; 718/100; 718/108; 711/141; 700/17; 700/83; 700/86; 701/1; 712/226

(58) Field of Classification Search ........ 718/100–108; 711/141; 710/48, 260; 712/32, 226; 701/1; 700/17, 83, 86
See application file for complete search history.

(56) References Cited

U.S. PATENT DOCUMENTS

| | | | |
|---|---|---|---|
| 3,662,401 A * | 5/1972 | Collins et al. .............. 718/103 |
| 4,109,311 A * | 8/1978 | Blum et al. ................. 712/226 |
| 4,937,740 A | 6/1990 | Agarwal et al. |
| 4,954,948 A * | 9/1990 | Hira et al. ................... 718/107 |
| 5,566,338 A * | 10/1996 | Kodama et al. ............ 710/260 |
| 5,619,409 A * | 4/1997 | Schultz et al. ................ 700/17 |
| 5,680,645 A * | 10/1997 | Russell et al. ................ 710/48 |
| 5,844,795 A * | 12/1998 | Johnston et al. .............. 700/83 |
| 5,872,909 A | 2/1999 | Wilner et al. |
| 5,991,792 A * | 11/1999 | Nageswaran ................ 718/102 |
| 6,009,454 A * | 12/1999 | Dummermuth ............. 718/108 |
| 6,122,712 A * | 9/2000 | Torii .......................... 711/141 |
| 6,128,641 A * | 10/2000 | Fleck et al. ................. 718/108 |
| 6,272,388 B1* | 8/2001 | Buvel et al. .................. 700/86 |
| 6,304,891 B1* | 10/2001 | Anderson et al. ........... 718/107 |

FOREIGN PATENT DOCUMENTS

DE    195 00 957    1/1996

\* cited by examiner

*Primary Examiner*—Meng-Al T. An
*Assistant Examiner*—Jennifer N. To
(74) *Attorney, Agent, or Firm*—Kenyon & Kenyon LLP

(57) ABSTRACT

A method and a control unit for controlling technical procedures, particularly in a motor vehicle. In the method, a control program of a computing element, particularly a microprocessor, is processed. The control program is subdivided into several tasks and each task is subdivided into several processes. The tasks are processed in a cooperative mode or in a preemptive mode. After the processing of the control program, in order to make possible a simulation as close to reality as possible, particularly an offline open loop simulation, it is proposed that the process sequence be stored during the processing of the control program. Preferably, before the processing of the control program, a unique identifier is assigned to each process, and, during the processing of the control program, only the identifier of the processed process most recently processed before the beginning of a finished task is stored.

11 Claims, 6 Drawing Sheets

| | Measured Data File | |
|---|---|---|
| First Cycle | FinishedProcessNumber = 0 | |
| Task B | TaskB_PredecessorPRC = 0 | |
| | FinishedProcessNumber = 121 | |
| | ... | |
| | FinishedProcessNumber = 129 | TaskB_PredecessorPRC = 0 |
| Task A 1 | TaskA_PredecessorPRC = 129 | |
| | FinishedProcessNumber = 345 | |
| | ... | |
| | FinishedProcessNumber = 372 | TaskA_PredecessorPRC = 129 |
| Task B | TaskB_PredecessorPRC = 372 | |
| | FinishedProcessNumber = 121 | |
| | ... | |
| | FinishedProcessNumber = 129 | TaskB_PredecessorPRC = 372 |
| Task A 2 | TaskA_PredecessorPRC = 129 | |
| | FinishedProcessNumber = 373 | |
| | ... | |
| | FinishedProcessNumber = 384 | TaskA_PredecessorPRC = 129 |
| Second Cycle | | |
| Task B | TaskB_PredecessorPRC = 384 | |
| | FinishedProcessNumber = 121 | |
| | ... | |
| | FinishedProcessNumber = 129 | TaskB_PredecessorPRC = 384 |
| Task A 1 | TaskA_PredecessorPRC = 129 | |
| | FinishedProcessNumber = 345 | |
| | ... | |
| | FinishedProcessNumber = 383 | TaskA_PredecessorPRC = 129 |
| Task B | TaskB_PredecessorPRC = 383 | |
| | FinishedProcessNumber = 121 | |
| | ... | |
| | FinishedProcessNumber = 129 | TaskB_PredecessorPRC = 383 |
| Task A 2 | TaskA_PredecessorPRC = 129 | |
| | FinishedProcessNumber = 384 | TaskA_PredecessorPRC = 129 |

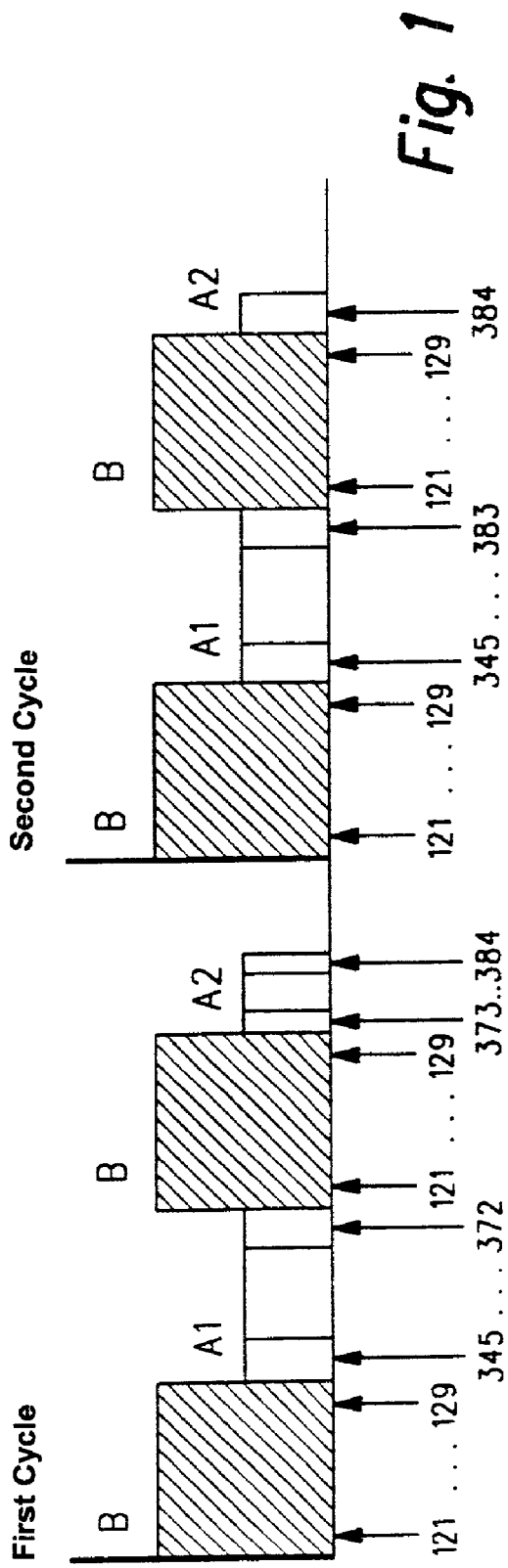

|  |  | Measured Data File |
|---|---|---|
| First Cycle | FinishedProcessNumber = 0 |  |
| Task B | TaskB_PredecessorPRC = 0<br>FinishedProcessNumber = 121<br>. . .<br>FinishedProcessNumber = 129 | TaskB_PredecessorPRC = 0 |
| Task A 1 | TaskA_PredecessorPRC = 129<br>FinishedProcessNumber = 345<br>. . .<br>FinishedProcessNumber = 372 | TaskA_PredecessorPRC = 129 |
| Task B | TaskB_PredecessorPRC = 372<br>FinishedProcessNumber = 121<br>. . .<br>FinishedProcessNumber = 129 | TaskB_PredecessorPRC = 372 |
| Task A 2 | TaskA_PredecessorPRC = 129<br>FinishedProcessNumber = 373<br>. . .<br>FinishedProcessNumber = 384 | TaskA_PredecessorPRC = 129 |
| Second Cycle |  |  |
| Task B | TaskB_PredecessorPRC = 384<br>FinishedProcessNumber = 121<br>. . .<br>FinishedProcessNumber = 129 | TaskB_PredecessorPRC = 384 |
| Task A 1 | TaskA_PredecessorPRC = 129<br>FinishedProcessNumber = 345<br>. . .<br>FinishedProcessNumber = 383 | TaskA_PredecessorPRC = 129 |
| Task B | TaskB_PredecessorPRC = 383<br>FinishedProcessNumber = 121<br>. . .<br>FinishedProcessNumber = 129 | TaskB_PredecessorPRC = 383 |
| Task A 2 | TaskA_PredecessorPRC = 129<br>FinishedProcessNumber = 384 | TaskA_PredecessorPRC = 129 |

Fig. 3

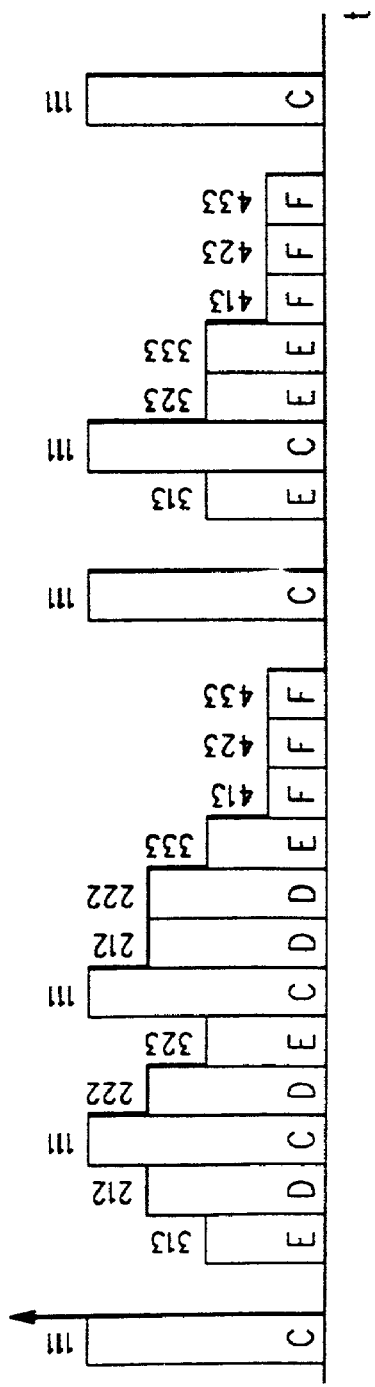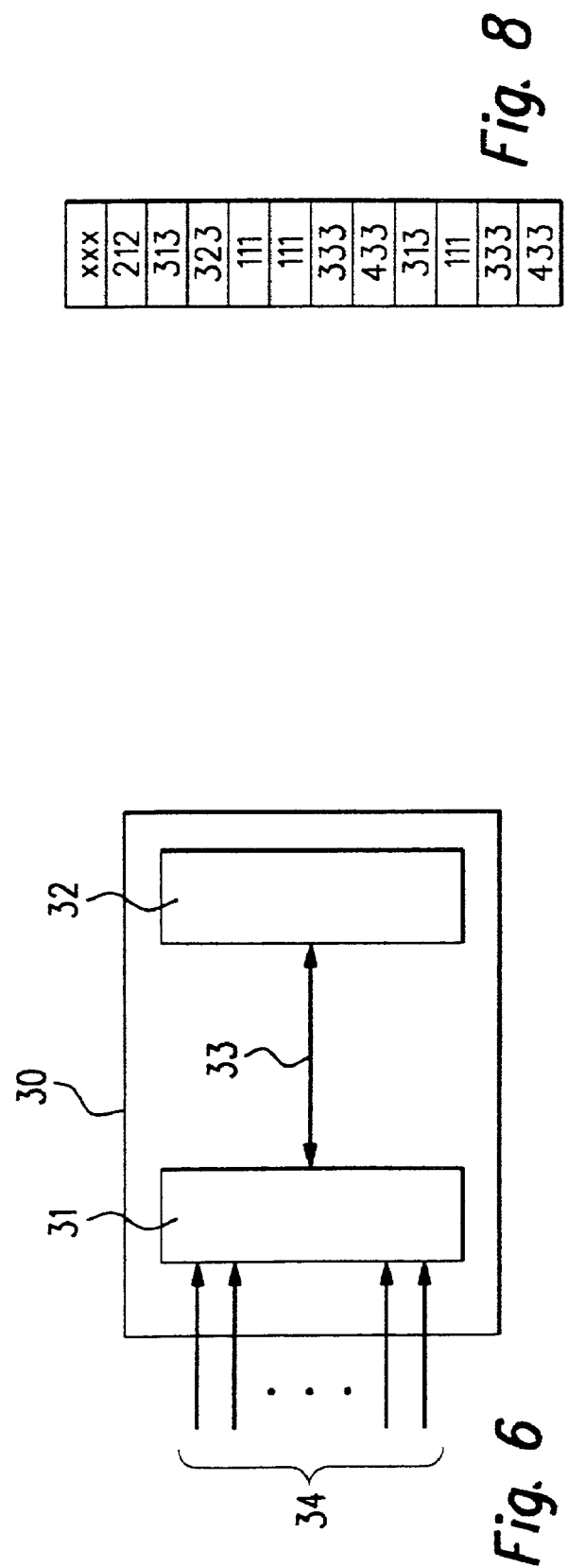

| Task A | Task B |
|---|---|
| Process345 () ; | Process121 () : |
| Process346 () ; | Process122 () : |
| . . . | . . . |
| Process383 () ; | Process128 () : |
| Process384 () ; | Process129 () : |

Fig. 9

|  | First Cycle | Second Cycle |
|---|---|---|
| Task B | 121...129 | 121...129 |
| Task A | 345...384 | 345...384 |
| Task B | 121...129 | 121...129 |

Fig. 10

METHOD AND CONTROL UNIT FOR CONTROLLING TECHNICAL PROCEDURES IN A MOTOR VEHICLE

FIELD OF THE INVENTION

The present invention relates to a method for controlling technical procedures, particularly in a motor vehicle. In the method, a control program is processed by a computing element, particularly a microprocessor. The control program is subdivided into several tasks, and each task into at least one process. The tasks are executed in a cooperative or in a preemptive mode.

The present invention also relates to a control unit for controlling technical processes, particularly in a motor vehicle. The control unit has a computing element, in particular a microprocessor, on which a control program can be run. The control program is subdivided into several tasks, and each task includes at least one process. The tasks are executed in a cooperative or in a preemptive mode.

The present invention further relates to a storage element, in particular a read only memory, a random access memory or a flash memory for a control unit, especially of a motor vehicle. Stored in the memory element is a control program which is executable on a computing element, particularly on a microprocessor.

Finally, the present invention also relates to a control program which is executable on a computing element, particularly on a microprocessor.

BACKGROUND INFORMATION

The processing of individual tasks of a control program in a cooperative mode means that, in response to differently prioritized tasks, a higher prioritized task to be executed leads to the interruption of a lower prioritized task being executed at the moment. Differently from preemptive mode, in which a higher prioritized task to be executed interrupts a process of a lower prioritized task being executed at the moment, in the cooperative mode, the higher prioritized task awaits the end of the process of the lower prioritized task being executed at the moment. Only then is the lower prioritized task interrupted, and the higher prioritized task is executed. When the higher prioritized task is completed, the lower prioritized task is continued at the process before which it was interrupted.

The processing of tasks of a control program in cooperative mode is known from German Published Patent Application No. 195 00 957. The interruption of a lower prioritized task by a higher prioritized task belongs to the objects of a multitasking operating system. Such a multitasking operating system, which supports the cooperative mode as well as the preemptive mode in the execution of control programs is, for example, the real time operating system ERCOS$^{EK}$ of the firm ETAS, Entwicklungs- und Applikationswerkzeuge für elektronische System (Development and Application Tools for Electronic Systems) GmbH & Co. KG, Stuttgart, Germany, (cf ETAS GmbH & Co. KG: ERCOS$^{EK}$ V2.0.0 Manual, Stuttgart, 1998). Specific reference is made to German Published Patent Application No 195 00 957 and the ERCOS$^{EK}$ handbook.

The running time of the processes fluctuates according to the loading of the computing element. For this reason, and for reasons of the possible interruptions caused by other, higher prioritized tasks, the sequence of process calls can be different for multiple executions of one and the same control program. That means that, after the execution of the control program, the exact sequence of process calls is not known, and also cannot be reconstructed, for example, for simulation purposes.

Various methods are known for the simulation of a control program, or of parts thereof (algorithm). A subsequent simulation of an algorithm or of the control program, using measured data, is denoted as offline open loop simulation (OOL). A so-called offline closed loop simulation (OCL) concerns simulation of an algorithm or of the control program with a simulation model in a closed simulation loop. The lacking reproducibility of the sequence of the executed processes leads to considerable difficulties, in particular in the case of a subsequent simulation of the algorithm using measured data (OOL).

According to the related art, algorithms which are controlled by a multitasking operating system are usually simulated in an optimum state. That means that the individual tasks of the control program are called up in such a way that no interruption takes place.

In German Published Patent Application No. 195 00 957 it is mentioned that the simulation of a control program to be executed in the cooperative mode has advantages over the simulation of a program to be executed in the preemptive mode, since the time sequence of program execution and the effect of interruptions can be simulated.

That is possible without further consideration because the individual processes are not interrupted in the cooperative mode, and the number of variables describing the program, which variables are stored in a stack storage, is constant. Thereby, the interruptions between the processes can be very well simulated during the development phase, since the number of possibilities of an interruption is limited, and the interruptions are independent of the program sequence.

Because of the lack of reproducibility of the process sequence subsequently to an actual processing of a control program, all simulations, known from the related art, of algorithms of a control program to be processed in a cooperative or in a preemptive mode have the disadvantage that a simulation under real conditions is not possible.

SUMMARY OF THE INVENTION

Therefore, the present invention is based on making possible a simulation of algorithms of a control program to be executed in a cooperative or a preemptive mode using measured data (OOL) under conditions as close to reality as possible.

To attain this object, starting from the method for controlling technical procedures of the kind named at the beginning, the present invention proposes that the process sequence be stored during the processing of the control program.

Using the method according to the present invention, after the processing of the control program, the process sequence can be reproduced with the aid of the stored data. This reproduced process sequence can then serve as the basis for a simulation of the algorithms of the control program. This makes possible a simulation of the algorithms that is particularly close to reality, especially using measured data according to an OOL simulation. The measurements and the simulation results can be compared to each other, and an effective error search in the control program is possible. The method according to the present invention provides the basis for a realistic process run of a control program being able to be simulated in the first place. For the practical execution of this method according to the present invention, for example, suitable commands are added to each process and/or to each task.

According to an advantageous further refinement of the present invention, it is proposed that, before the processing of the control program, a unique identifier be assigned to each process, and that the process sequence is stored with the aid of the process identifiers during processing of the control program. Thus, within the framework of the processing of a process, its identifier is stored in a certain memory region. After the execution of the control program, the process sequence can be reproduced with the aid of the identifiers stored in the memory region. The identifier is formed, for instance, as a multi-digit number.

According to one preferred exemplary embodiment of the present invention, it is suggested that, during processing of the control program, only the identifier of the most recently processed process before the beginning of a new task be stored in each case for a new task. This specific embodiment of the method according to the present invention makes use of the fact that each task of a control program is defined by a so-called process list, in which the individual processes of the task are listed in the sequence of their processing, one after the other. Thus, with the aid of the process lists of the tasks of a control program, the process sequence can be fully reproduced after processing of the control program, together with the stored identifier of the most recently processed process before the beginning of a new task.

Alternatively, according to another preferred specific embodiment of the present invention, it is proposed that, during processing of the control program, in each case, for a finished task, only the identifier of the most recently processed process before the beginning of the finished task be stored. With the aid of the process lists of the tasks, the process sequence can be fully reproduced after processing of the control program, together with the stored identifier of the most recently processed process before the beginning of a finished task.

These two specific embodiments have the advantage that the amount of data to be stored, that is required for complete reproducibility of the process sequence, can be considerably reduced.

It is further proposed that, during processing of the control program, the identifier of each processed process be stored in a variable, and during processing of each task, the content of the variables be stored in a process sequence data file. The variable, in which the identifier of each processed process is stored, is preferably designed as a global variable. For the reproduction of the process sequence after processing of the control program, the process lists of the tasks and the process sequence data file are evaluated.

Advantageously, at the beginning of each task, the content of the variable is stored in a task-specific variable, and during further processing of the task, the content of the task-specific variable is stored in the process sequence data file. Thus, during processing of the control program, the content of the variables is constantly being overwritten with the identifier of the process currently being processed, so that, when a new task is called up, the identifier of the process most recently processed, before the task was called up, is in storage. At the beginning of a task, the content of this variable is written into a task-specific variable. Thus, the identifier of the process processed immediately before the beginning of the current task is always recorded in the task-specific variable. During further processing of the task, the content of the task-specific variable is stored in the process sequence data file. It is conceivable that the content of the task-specific variables could be stored in a measuring data file, during further processing of the task of measuring technique, together with all other measured variables of this task. Thus the process sequence data file would be a component of this measuring data file.

Actualizing the method according to the present invention is especially meaningful in the form of a storage element provided for a control unit, in particular of a motor vehicle. In this connection, a control program is stored on the storage element, which is suitable for running on a computing element, particularly on a microprocessor, for carrying out the method according to the present invention. In this case, then, the present invention is actualized by a control program stored on the storage element, so that this storage element provided with the control program represents the present invention in the same way as the method, for the execution of which the control program is suitable. In particular, an electrical storage medium can be used as the storage medium, for example, a read only memory, a random access memory or a flash memory.

The present invention also relates to a control program which is suitable for executing the method according to the present invention, if it runs on a computing element, particularly on a microprocessor. A computer program is designated as a control program when it is used to control technical processes, particularly in a motor vehicle. In this connection, it is particularly preferred if the control program is stored in a storage element, particularly in a flash memory.

As a further attainment of the object of the present invention it is proposed, starting from the control unit for controlling technical processes of the kind named at the beginning, that the control unit has an arrangement for storing the process sequence during the processing of the control program.

According to one advantageous further development of the present invention, it is proposed that the control unit have an arrangement for executing of a method according to the present invention.

BRIEF DESCRIPTION OF THE DRAWINGS

FIG. 1 shows a process sequence in two cycles during the processing of a control program.

FIG. 2 shows a table of the sequence of the processes during the two cycles in FIG. 1.

FIG. 3 shows a table of the assignment of different variables during the execution of the method according to the present invention during the two cycles in FIG. 1.

FIG. 6 shows a control unit according to the present invention.

FIG. 7 shows a process sequence during the processing of a further control program.

FIG. 8 shows a table showing in each case the processes processed most recently before the beginning of a finished task during the process sequence in FIG. 7.

FIG. 9 shows process lists for task A and task B.

FIG. 10 shows a table having the sequence of the processes during the simulation of a control program with the aid of a simulation method known from the related art.

DETAILED DESCRIPTION

Figure 4:
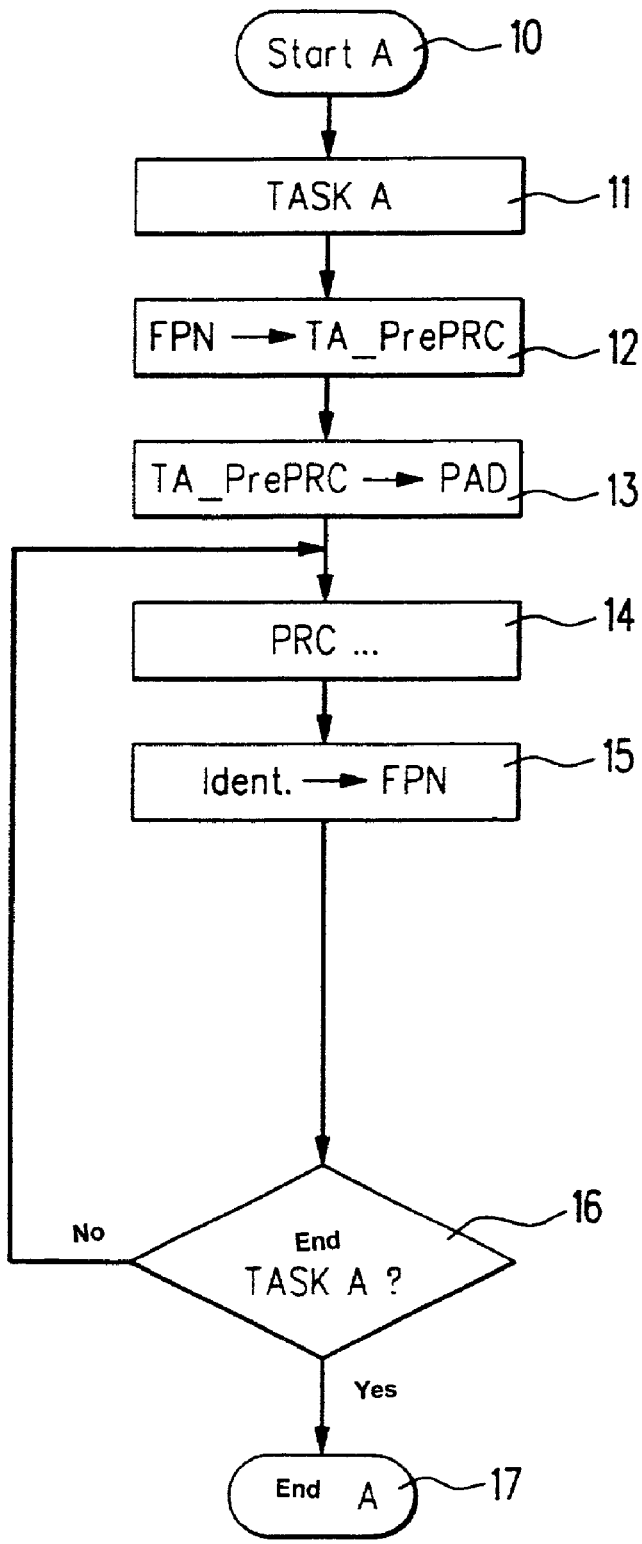
FIG. 4 shows a sequence diagram of the method according to the present invention for the processing of a task A.

Control programs for controlling technical procedures, particularly in a motor vehicle, can be processed on a computing element, particularly on a microprocessor of a control unit. The control programs can be subdivided into several tasks, and each task, in turn, can be subdivided into several processes. A task is called up at a certain point in time, or regularly, at a certain scanning time, and is processed. Each task is assigned a certain priority. During processing of the control program, if two tasks are to be executed simultaneously, the priorities of the two tasks are compared, and the task having the higher priority is processed first.

If, for instance, a task A is processed, and a task B is to be executed, different situations can come up, depending on the configuration of tasks selected by a programmer:

If task A has a higher priority than task B, execution of task B is delayed until task A is finished.

If task B has a higher priority than task A, processing of task A is interrupted and task B is executed. In case the programmer has selected execution of the tasks in a so-called cooperative mode, the execution of task B waits for the end of the current process of task A. As soon as this process is finished, task A is interrupted and task B is carried out. When task B is finished, task A is processed further at the beginning of the process before which it was interrupted for the execution of task B.

In case the programmer has selected execution of the tasks in a preemptive mode, task B interrupts the current process of task A and task B is directly carried out. Thereafter, task A is processed further at the interrupted process.

Interruption of one task by another task having a higher priority is a part of the functions of a multitasking operating system. The running time of the processes varies according to the load of the computing element on which the control program is being processed. For this reason, and because of the possible interruption caused by other tasks, the sequence of calling up processes can be different in a multiple execution of one and the same control program (cf first and second cycle in FIG. 1). Thus, after processing of the control program, the sequence in which the individual processes of the tasks were called up is not known.

FIG. 1 shows, for example, the processing of two tasks in a first cycle and a second cycle. Each individual process of the tasks is assigned a unique identifier in the form of a three digit number. The individual processes of a task are stored in a process list (cf FIG. 9) in the sequence of execution during the processing of a control program. The process lists are evaluated by the operating system in order to determine the process sequence online. Task A includes processes 345 through 384, and task B includes processes 121 through 129. Task A is called up every 20 milliseconds. Task B is called up every 10 milliseconds at a higher priority than task A. Both tasks work in the cooperative mode, i.e. Task A can be interrupted by the higher prioritized task B, between two processes.

FIG. 2 shows the sequence of processing of the processes in the first cycle and in the second cycle. Processes 121 through 129 of task B are processed in the first cycle. Subsequently, beginning with process 345, the processes of task A are processed. However, the processing of the processes is interrupted by task B. In the first cycle, the interruption of task A appears after processing of process 372, and in the second cycle it appears only after the processing of process 383. According to that, in the first cycle processes 373 through 384 have to be processed, after the second processing of task B, and in the second cycle, only process 384 of task A has to be executed.

The fact that the sequence of the processes can be different, means that a definite process sequence is no longer reproducible after the processing of the control program. This leads to considerable difficulties, particularly in the case of a subsequent simulation of the control program's algorithms using measured data (so-called offline open loop (OOL) simulation).

That is why, according to the related art, algorithms controlled by a multitasking operating system are, as a rule, simulated in an optimum state, i.e. tasks A, B are called up in such a way that no interruption takes place. The corresponding sequence of the processes in the first cycle and in the second cycle is illustrated in FIG. 10 in the case of a simulation, with the aid of a simulation method known from the related art. It can be clearly recognized that there is a difference between the simulated process sequence (FIG. 10) and the actual process sequence (FIG. 2).

In order to make possible as closely to reality as possible a simulation of a control program's algorithms, particularly an OOL simulation close to reality, according to the present invention, storing the process sequence during processing of the control program is proposed. In order to reduce the amount of data to be stored, not all processed processes are stored, but only the last processed process before the beginning of a new or a finished task A, B.

Each process is assigned a unique identifier, which in the present exemplary embodiment is made up of a three-digit number (processes 345 through 384 for task A and processes 121 through 129 for task B). Suitable program commands are added to each process and each task of the control program, which are required for an actualization of the method according to the present invention.

During processing of the control program, at the end of each process, the identifier of the process that has just been processed is updated in a global variable finished process number (FPN). Thus, the variable FPN always has recorded in it the identifier of the process processed last. At the beginning of each task A, B, the variable FPN is copied to a task-specific variable (task A predecessorPRC, task B predecessorPRC. In this task-specific variable is thus always recorded the identifier of the process which was processed directly before the beginning of the current task A, B. During the further processing of each task, the content of each task-specific variable (task A predecessorPRC, task B predecessorPRC) is stored in a process sequence data file (PAD). In particular, each task-specific variable of measuring technique is stored together with all other measured variables of this task A, B in a measuring data file, the process sequence data file being a component of the measuring data file.

FIG. 7 shows a process sequence of a further control program. The control program includes four tasks, C, D, E and F having different priorities. Each task C, D, E, F includes one or more processes. Task C includes process 111, task D includes processes 212 and 222, task E includes processes 313, 323 and 333 and task F includes processes 413, 423 and 433. In FIG. 7, each process is represented by a bar. The height of the bars reflects the priority of tasks C, D, E, F. During processing of the control program, if the process sequence is stored in the process sequence data file, with the aid of the identifiers of all the processes, the table has the following content: 111, 313, 212, 111, 222, 323, 111, 212, 222, 333, 413, 423, 433, 111, 313, 111, 323, 333, 413, 423, 433, 111.

In order to reduce the amount of data, to be stored in the process sequence data file, which is for the complete reproducibility of the process sequence, during the processing of the control program, only the identifier of the last process to be processed before the beginning of a finished task is stored. The content of a process sequence data file resulting from this is shown in FIG. 8. Instead of the 22 elements shown above, the process sequence data file in FIG. 8 contains only 12 elements.

The first finished task is task C. The process processed before the beginning of task C is not known Therefore, "xxx" is entered in the process sequence data file.

Thereafter, task E is begun but not finished, and after that task D, though it is also not finished. The next finished task is again task C. The process processed before the beginning of task C is 212. Therefore, "212" is entered in the process sequence data file.

After that, task D is continued and finished. The process processed before the beginning of task D is 313. Therefore, "313" is entered in the process sequence data file.

After that, task D is continued and finished. The next finished task is again task C. The process processed before the beginning of task C is 323. Therefore, "323" is entered in the process sequence data file.

After that, task D is begun and finished too. The process processed before the beginning of task D is 111. Therefore, "111" is entered in the process sequence data file.

After that, task E is continued and finished. The process processed before the beginning of task E is 111. Therefore, "111" is entered in the process sequence data file.

After that, task F is begun and finished too. The process processed before the beginning of task F is 333. Therefore, "333" is entered in the process sequence data file. The method is continued until the control program is finished. This yields the following content of the process sequence data file: xxx, 212, 313, 323, 111, 111, 333, 433, 313, 111, 333, 433.

After processing of the control program, first of all the measuring data file is read in for simulation purposes. The process sequence is reconstructed with the aid of the process lists (cf FIG. 9) and the data stored in the measured data file. The method according to the present invention creates the foundation for simulating a real process sequence in the first place, in a control program. The measurements and the simulation results can be compared with each other, and they make possible an effective error search in the software of the control program.

For the process sequence in FIG. 1, FIG. 3 shows the content of the global variables FinishedProcessNumber (FPN) and task-specific variable (Task A_redecessorPRC, Task B_predecessorPRC). These data are stored in the measuring data file.

FIG. 4 shows a sequence diagram for processing Task A of the exemplary embodiment in FIG. 1. The sequence diagram begins in a function block 10 with Start. In function block 11 Task A is selected. In a function block 12 the content of the global variables (FinishedProcessNumber, FPN) is copied to the task-specific variable (Task A_PredecessorPRC). In function block 13 the content of the task-specific variables is then stored in the program sequence data file (PAD). Furthermore, in a function block 14 a process (PRC) selected with the aid of the process list of Task A (cf FIG. 9) is executed. The identifier of this process is stored in a function block 15 in the global variables (FinishedProcessNumber). Subsequently, in an interrogation block 16 it is examined whether Task A is finished. If not, branching to function block 14 takes place, where, according to the process list, the next process of Task A is selected. If Task A is finished, the sequence diagram ends in function block 17.

Figure 5:
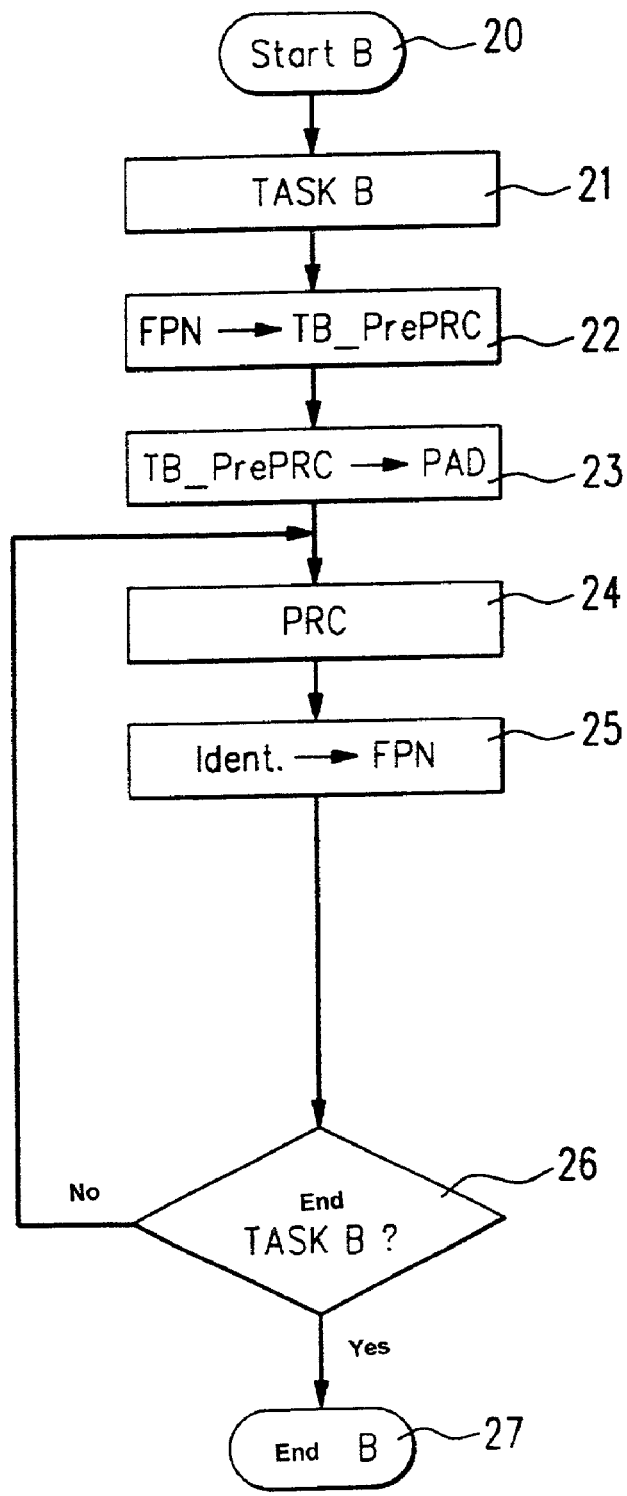
FIG. 5 shows a sequence diagram of the method according to the present invention for the processing of a task B.

FIG. 5 shows a sequence diagram for processing Task B of the exemplary embodiment. Reference numerals 20 through 27 were selected for function blocks 5 corresponding to function blocks 10 through 17 in FIG. 4. The execution of Task B takes place correspondingly to the execution described for Task A.

Naturally, the execution of task A and task B can be interrupted at any time, or, in the cooperative mode, after finishing the current process, by a more highly prioritized task. This occurs, for example, by an interrupt-call-up.

In FIG. 6, a control unit according to the present invention, for controlling technical procedures, particularly in a motor vehicle, is designated in its entirety by reference numeral 30. Control unit 30 has a computing element, in particular a microprocessor 31, on which a control program can be run. Control unit 30 further includes a storage element 32, in which the control program is stored. The control program to be executed by microprocessor 31, or parts of it, are transmitted to microprocessor 31 via a data connection 33, which is designed, for example, as a bus line, and are processed there. Measured values 34 are brought to microprocessor 31 via suitable interfaces, and are processed in microprocessor 31. Measured values 34 are stored, for example, in storage element 32 in a measured data file. According to the present invention, in this measured data file, data on process sequence, particularly sequence of processing of the processes can also be stored during processing of the control program. These data and measured values 34 can be utilized for simulating purposes after processing of the control program.

What is claimed is:

1. A computer-implemented method for controlling a technical procedure in a motor vehicle, comprising the steps of:

triggering a computing element to process a control program;

subdividing the control program into a plurality of tasks, each task including at least one process;

processing each task in a cooperative mode or in a preemptive mode, wherein a unique identifier is assigned to each process before processing the control program;

storing a process sequence during processing of the control program, wherein the process sequence is stored in accordance with the unique identifiers during the processing of the control program; and during the processing of the control program, in each case for a new task, storing only the unique identifier of a process most recently processed before a beginning of the new task.

2. The method according to claim 1, wherein:

the computing element includes a microprocessor.

3. The method according to claim 1, further comprising the steps of:

during the processing of the control program, storing the unique identifier of each processed process in a variable; and during the processing of each task, storing a content of the variable in a process sequence data file.

4. The method according to claim 3, further comprising the steps of:

at the beginning of each task, storing the content of the variable in a task-specific variable; and during a further processing of each task, storing a content of the task-specific variable in the process sequence data file.

5. A computer-implemented method for controlling a technical procedure in a motor vehicle, comprising the steps of:
- triggering a computing element to process a control program;
- subdividing the control program into a plurality of tasks, each task including at least one process;
- processing each task in a cooperative mode or in a preemptive mode, wherein a unique identifier is assigned to each process before processing the control program;
- storing a process sequence during processing of the control program, wherein the process sequence is stored in accordance with the unique identifiers during the processing of the control program; and
- during the processing of the control program, in each case for a finished task, storing only the unique identifier of a process most recently processed before a beginning of the finished task.

6. A memory element for a control unit arranged in a motor vehicle, the memory element storing a control program that is executable by a computing element to control a method comprising:
- triggering the computing element to process the control program;
- subdividing the control program into a plurality of tasks, each task including at least one process;
- processing each task in a cooperative mode or in a preemptive mode, wherein a unique identifier is assigned to each process before processing the control program;
- storing the process sequence during processing of the control program, wherein the process sequence is stored in accordance with the unique identifiers during the processing of the control program; and
- during the processing of the control program, in each case for a new task, storing only the unique identifier of a process most recently processed before a beginning of the new task.

7. The memory element according to claim 6, wherein:
the memory element includes a read-only memory, a random access memory, or a flash memory.

8. The memory element according to claim 6, wherein:
the computing element includes a microprocessor.

9. A control unit for controlling a technical procedure in a motor vehicle, comprising:
- a computing element executing a control program, wherein the control program is subdivided into a plurality of tasks, each task including at least one process, and each task being processed in a cooperative mode or a preemptive mode, wherein a unique identifier is assigned to each process before processing the control program; and
- a storage arrangement for storing a process sequence during a processing of the control program, wherein the process sequence is stored in accordance with the unique identifiers during the processing of the control program, and wherein, during the processing of the control program, in each case for a new task, only the unique identifier of a process most recently processed before a beginning of the new task is stored.

10. The control unit according to claim 9, wherein:
the computing element includes a microprocessor.

11. A control unit for controlling a technical procedure in a motor vehicle, comprising:
- a computing element executing a control program, wherein the control program is subdivided into a plurality of tasks, each task including at least one process, and each task being processed in a cooperative mode or a preemptive mode, wherein a unique identifier is assigned to each process before processing the control program; and
- a storage arrangement for storing a process sequence during a processing of the control program, wherein the process sequence is stored in accordance with the unique identifiers during the processing of the control program, and wherein, during the processing of the control program, in each case for a finished task, only the unique identifier of a process most recently processed before a beginning of the finished task is stored.

* * * * *